United States Patent
Song et al.

(10) Patent No.: US 11,715,197 B2
(45) Date of Patent: Aug. 1, 2023

(54) IMAGE SEGMENTATION METHOD AND DEVICE

(71) Applicant: SAMSUNG SDS CO., LTD., Seoul (KR)

(72) Inventors: Hyo-Seob Song, Seoul (KR); Joon-Ho Lee, Seoul (KR); Ji-Eun Song, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/753,051

(22) PCT Filed: May 22, 2019

(86) PCT No.: PCT/KR2019/006132
§ 371 (c)(1),
(2) Date: Apr. 2, 2020

(87) PCT Pub. No.: WO2019/231162
PCT Pub. Date: Dec. 5, 2019

(65) Prior Publication Data
US 2020/0320711 A1    Oct. 8, 2020

(30) Foreign Application Priority Data

May 31, 2018   (KR) .................. 10-2018-0062295

(51) Int. Cl.
*G06T 7/00* (2017.01)
*G06T 7/11* (2017.01)
(Continued)

(52) U.S. Cl.
CPC ............ *G06T 7/0012* (2013.01); *G06F 18/22* (2023.01); *G06N 20/00* (2019.01); *G06T 7/0002* (2013.01);
(Continued)

(58) Field of Classification Search
CPC .. G06K 9/6256; G06K 9/4642; G06K 9/6215; G06K 9/6271; G06K 9/6212;
(Continued)

(56) References Cited

U.S. PATENT DOCUMENTS 9,430,697 B1     8/2016  Iliadis et al.
2011/0075935 A1* 3/2011  Baqai .................... G06T 7/0002
                                                   382/195
(Continued)

FOREIGN PATENT DOCUMENTS

CN    103634534 A    3/2014
CN    104318236 A    1/2015
(Continued)

OTHER PUBLICATIONS

Ren, Xiao-Ming, Xiao-Feng Wang, and Yang Zhao. "An efficient multi-scale overlapped block LBP approach for leaf image recognition." International Conference on Intelligent Computing. Springer, Berlin, Heidelberg, 2012. (Year: 2012).*
(Continued)

*Primary Examiner* — Vu Le
*Assistant Examiner* — Tracy Mangialaschi
(74) *Attorney, Agent, or Firm* — The PL Law Group, PLLC

(57) ABSTRACT

An image segmentation method according to an embodiment of the present invention is performed in a computing device having one or more processors and memory for storing one or more programs executed by means of the one or more processors, and includes the steps of: (a) receiving the input of an image; (b) generating a first-generation image segment set by dividing the input image in an overlapped manner; and (c) generating a second or higher-generation image segment set from the first-generation image segment set, wherein a subsequent-generation image segment set is
(Continued)

generated by dividing in an overlapped manner at least one of a plurality of image segments included in the previous-generation image segment set.

16 Claims, 16 Drawing Sheets

(51) Int. Cl.
*G06N 20/00* (2019.01)
*G06F 18/22* (2023.01)
*G06V 10/75* (2022.01)
*G06V 10/764* (2022.01)
*G06V 10/774* (2022.01)
*G06V 10/82* (2022.01)
*G06V 10/50* (2022.01)
*G06V 40/18* (2022.01)

(52) U.S. Cl.
CPC .............. *G06T 7/11* (2017.01); *G06V 10/50* (2022.01); *G06V 10/758* (2022.01); *G06V 10/764* (2022.01); *G06V 10/774* (2022.01); *G06V 10/82* (2022.01); *G06V 40/193* (2022.01); *G06T 2207/20081* (2013.01)

(58) Field of Classification Search
CPC .............. G06K 9/0061; G06T 7/0002; G06T 2207/20081; G06T 2207/10072; G06T 2207/20084; G06T 2207/30041; G06T 7/11; G06T 7/0012; G06N 20/00; G06V 10/82; G06V 10/758; G06V 10/50; G06V 40/193; G06V 10/764; G06V 10/774; G06F 18/22
See application file for complete search history.

(56) References Cited

U.S. PATENT DOCUMENTS

| | | | |
|---|---|---|---|
| 2012/0045095 A1 | 2/2012 | Tate et al. | |
| 2018/0060719 A1* | 3/2018 | Kisilev | ................ G06N 3/0454 |

FOREIGN PATENT DOCUMENTS

| | | |
|---|---|---|
| CN | 104598885 A | 5/2015 |
| CN | 105787466 A | 7/2016 |
| CN | 107832807 A | 3/2018 |
| KR | 10-2016-0015583 A | 2/2016 |

OTHER PUBLICATIONS

Oquab, Maxime, et al. "Learning and Transferring Mid-level Image Representations Using Convolutional Neural Networks." 2014 IEEE Conference on Computer Vision and Pattern Recognition. IEEE, 2014. (Year: 2014).*

Liu, Shu, et al. "Multi-scale patch aggregation (mpa) for simultaneous detection and segmentation." Proceedings of the IEEE Conference on Computer Vision and Pattern Recognition. 2016. (Year: 2016).*

Jaafar, Hussain F., Asoke K. Nandi, and Waleed Al-Nuaimy. "Automated detection of exudates in retinal images using a split-and-merge algorithm." 2010 18th European signal processing conference. IEEE, 2010. (Year: 2010).*

Kavitha, S., and K. Duraiswamy. "Automatic detection of hard exudates from fundus images using adaptive neuro-fuzzy inference system." Australian Journal of Electrical and Electronics Engineering 9.3 (2012): 315-325. (Year: 2012).*

European Search Report For EP19811854.9 dated Dec. 17, 2020 from European patent office in a counterpart European patent application.

Xiao-Ming Ren et al., "An Efficient Multi-scale Overlapped Block LBP Approach for Leaf Image Recognition", Intelligent Computing Theories and Applications, Springer Berlin Heidelberg, Berlin, Heidelberg , pp. 237-243, 2012 ISBN: 978-3-642-31575-6.

Meyer Maria Ines et al., "A Deep Neural Network for Vessel Segmentation of Scanning Laser Ophthalmoscopy Images", Big data analytics in the social and ubiquitous context: 5th International Workshop on Modeling Social Media, MSM 2014, 5th International Workshop on Mining Ubiquitous and Social Environments, Muse 2014 and First International Workshop on Machine LE, ISBN 978-3-642-17318-9.

International Search Report for PCT/KR2019/006132 dated Sep. 9, 2019.

Girshick Ross et al., "Region-Based Convolutional Networks for Accurate Object Detection and Segmentation", IEEE Transactions on Pattern Analysis and Machine Intelligence. vol. 38, Issue 1, 2016, pp. 1-16.

Galpin F. et al., "AHG9: CNN-based driving of block partitioning for intra slices encoding", Joint Video Experts Team (JVET) of ITU-T SG 16 WP3 and ISO/IEC JTC 1/SC 29/WG 11. 10th Meeting. San Diego, US. 2018, pp. 1-12.

* cited by examiner

IMAGE SEGMENTATION METHOD AND DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/006132 filed on May 22, 2019, which claims priority to the benefit of Korean Patent Application No. 10-2018-0062295 filed in the Korean Intellectual Property Office on May 31, 2018, the entire contents of which are incorporated herein by reference.

TECHNICAL FIELD

The disclosed embodiments relate to image segmentation techniques.

BACKGROUND ART

The conventional deep learning-based classification technology has problems in that rich information of a high resolution image cannot be fully used when a classifier is trained, and final classification is possible only by secondarily applying conditions to the result classified using partial information.

In order to train a deep learning-based object classifier using an image as an input, a method is generally used in which the process of designating an area corresponding to an object in an image of a target to be classified and annotating a label to the designated area is performed, followed by reduction or resizing of the area to a uniform size to match an input terminal of a deep learning network selected for learning, and then learning is conducted.

This method may be highly effective in the case of person-dog-cat image classification in which objects are distinguished from one another only by their appearance. However, in the case of an image in which objects are identical in shape, but can be distinguished only by taking into account differences in internal information such as color, pattern, and texture (especially in the case of a reduced high resolution image), characteristic areas may disappear due to reduction or may be changed to the same shape. For example, a circular feature that exists in a 10×10 area in an image of 2000×2000 resolution is likely to disappear or change to a 1-pixel dot when the entire image is reduced to 200×200. In another example, features, such as circular, triangular, and rectangular patterns, that exist in 10×10 size in an image of 2000×2000 resolution may be all converted to 1-pixel dots when the entire image is reduced to 200×200, and hence the features disappear.

On the other hand, another method of image learning for a deep learning-based object classifier is to use image segments generated by dividing into a grid of equal-sized cells to facilitate parallel processing. However, in the case of being divided into a grid, it is difficult to find correlation between neighboring image segments, and the generated image segments may have only part of information, not the entire information of the object to be learned.

The learning method using image segments is better suited for the purpose of detection, classification, and localization to locate a classified fragmented image. A normal/abnormal classification problem is a typical problem that can be solved using detection techniques. In general, if a singularity is found, it is generally classified as abnormal.

However, even when a singularity is found, the classification into normal and abnormal is possible based on various complex combinations, such as the degree of singularity, the number of singularities, and the like. Therefore, accurate normal/abnormal classification is possible only through filtering by various combinations of rules even after the application of a detection technique. As a representative example, even when a lesion is found in an image, a disease is not unconditionally diagnosed and it is possible to diagnose as normal, not disease, depending on the severity of the lesion, the number of lesions, and the like.

SUMMARY

The disclosed embodiments are to provide an image segmentation device and method.

According to an embodiment of the present invention, an image segmentation method is performed in a computing device having one or more processors and memory for storing one or more programs executed by the one or more processors and includes the steps of (a) receiving an input image, (b) generating a first-generation image segment set by dividing the input image in an overlapped manner, and (c) generating a second or higher-generation image segment set from the first-generation image segment set, wherein a subsequent-generation image segment set is generated by dividing in an overlapped manner at least one of a plurality of image segments included in the previous-generation image segment set.

Each of a plurality of image segments included in a jth- (where j is an integer greater than or equal to 1) generation image segment set may include a region that overlaps one or more other image segments included in the jth-generation image segment set.

The step (c) may generate the subsequent-generation image segment set by dividing in an overlapped manner at least one image segment that satisfies a preset selection condition among the plurality of image segments included in the previous-generation image segment set.

The step (c) may include calculating pixel similarity in an image for each of the plurality of image segments included in the previous-generation image segment set and generating the subsequent-generation image segment set by dividing in an overlapped manner each of image segments that have the pixel similarity smaller than or equal to a preset reference value among the plurality of image segments included in the previous-generation image segment set.

The step (c) may terminate generation of the subsequent-generation image segment set when there is no image segment whose pixel similarity is smaller than or equal to the reference value.

The step (c) may terminate generation of the subsequent-generation image segment set when a preset segmentation termination condition is satisfied.

The step (c) may determine whether the preset segmentation termination condition is satisfied based on a size of each of the image segments included in the previous-generation image segment set and a preset reference value.

The step (c) may determine whether the preset segmentation termination condition is satisfied based on a total number of image segments included in image segment sets generated so far and a preset reference value.

The image segmentation method may further include (d) reducing the input image and some or all of the image segments included in each of the first to nth- (where n is an integer greater than or equal to 2) generation image segment sets to a preset size.

The image segmentation method may further include (e) training a deep learning-based image classifier using the reduced images.

According to another embodiment of the present invention, an image segmentation device includes one or more processors, a memory, and one or more programs, wherein the one or more programs are stored in the memory and configured to be executed by the one or more processors and the one or more programs comprise commands for performing the steps of (a) receiving an input image, (b) generating a first-generation image segment set by dividing the input image in an overlapped manner, and (c) generating a second or higher-generation image segment set from the first-generation image segment set, wherein a subsequent-generation image segment set is generated by dividing in an overlapped manner at least one of a plurality of image segments included in the previous-generation image segment set.

Each of a plurality of image segments included in a jth- (where j is an integer greater than or equal to 1) generation image segment set may include a region that overlaps one or more other image segments included in the jth-generation image segment set.

The step (c) may generate the subsequent-generation image segment set by dividing in an overlapped manner at least one image segment that satisfies a preset selection condition among the plurality of image segments included in the previous-generation image segment set.

The step (c) may include calculating pixel similarity in an image for each of the plurality of image segments included in the previous-generation image segment set and generating the subsequent-generation image segment set by dividing in an overlapped manner each of image segments that have the pixel similarity smaller than or equal to a preset reference value among the plurality of image segments included in the previous-generation image segment set.

The step (c) may terminate generation of the subsequent-generation image segment set when there is no image segment whose pixel similarity is smaller than or equal to the reference value.

The step (c) may terminate generation of the subsequent-generation image segment set when a preset segmentation termination condition is satisfied.

The step (c) may determine whether the preset segmentation termination condition is satisfied based on a size of each of the image segments included in the previous-generation image segment set and a preset reference value.

The step (c) may determine whether the preset segmentation termination condition is satisfied based on a total number of image segments included in image segment sets generated so far and a preset reference value.

The one or more programs may further include commands for performing (d) reducing the input image and some or all of the image segments included in each of the first to nth- (where n is an integer greater than or equal to 2) generation image segment sets to a preset size.

The one or more programs may further include commands for performing (e) training a deep learning-based image classifier using the reduced images.

According to embodiments of the present invention, image segment sets of a plurality of generations are generated by dividing an image in an overlapped manner, so that image segments correlated with each other can be generated without a loss of information on small feature areas in the image.

In addition, according to embodiments of the present invention, the image segments included in the image segment sets of a plurality of generations, which are divided in an overlapped manner, are used for training a deep learning-based image classifier and the image segments are converted into an input size of the image classifier to perform the training, so that the image segments included in the image segment set of the last generation can be learned while appearing to be zoomed-in as compared to the image segments included in the image segment set of a previous generation and the training can be performed by combining overall information of the image and partial information that is a feature of the image.

DETAILED DESCRIPTION

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
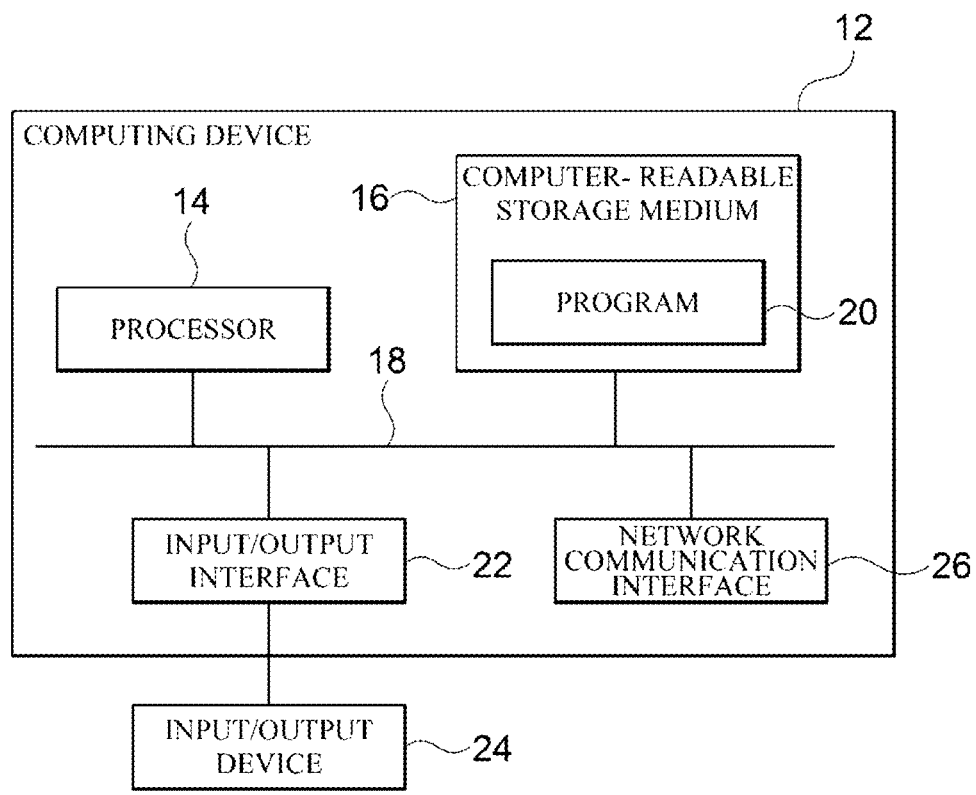
FIG. 1 is a block diagram for describing a computing environment including a computing device suitable for use in exemplary embodiments.

FIG. 1 is a block diagram for describing a computing environment including a computing device 10 suitable for use in exemplary embodiments. In the illustrated embodiment, each of the components may have functions and capabilities different from those described hereinafter and additional components may be included in addition to the components described herein.

The illustrated computing environment 10 includes a computing device 12. In an embodiment, the computing device may be an image segmentation device according to embodiments of the present invention. The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer readable storage medium 16 is configured to store computer executable commands and program codes, program data and/or information in other suitable forms. The programs stored in the computer readable storage medium 16 may include a set of commands executable by the processor 14. In an embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

Figure 2:
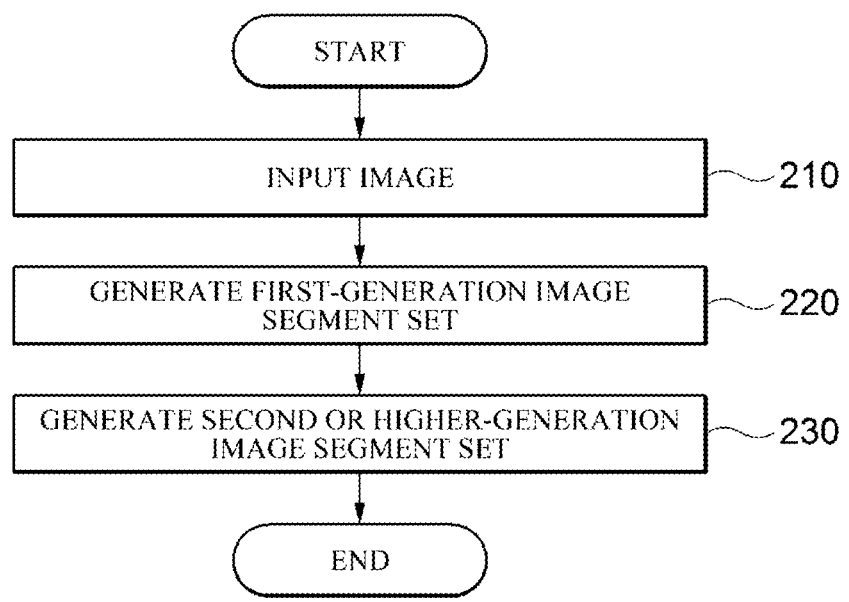
FIG. 2 is a flowchart illustrating an image segmentation method according to an embodiment of the present invention.

FIG. 2 is a flowchart illustrating an image segmentation method according to an embodiment of the present invention.

Referring to FIG. 2, in operation 210, a computing device 12 receives an image.

In this case, the input image may be an original image input by a user or obtained from an image database including a plurality of images collected in advance. However, the present invention is not limited thereto, and according to an embodiment, the input image may be an image in which unnecessary regions, for example, a margin or a background, are partially or completely removed from the original image. In this case, a method of removing the unnecessary regions is not necessarily limited to a particular method.

Figure 3:
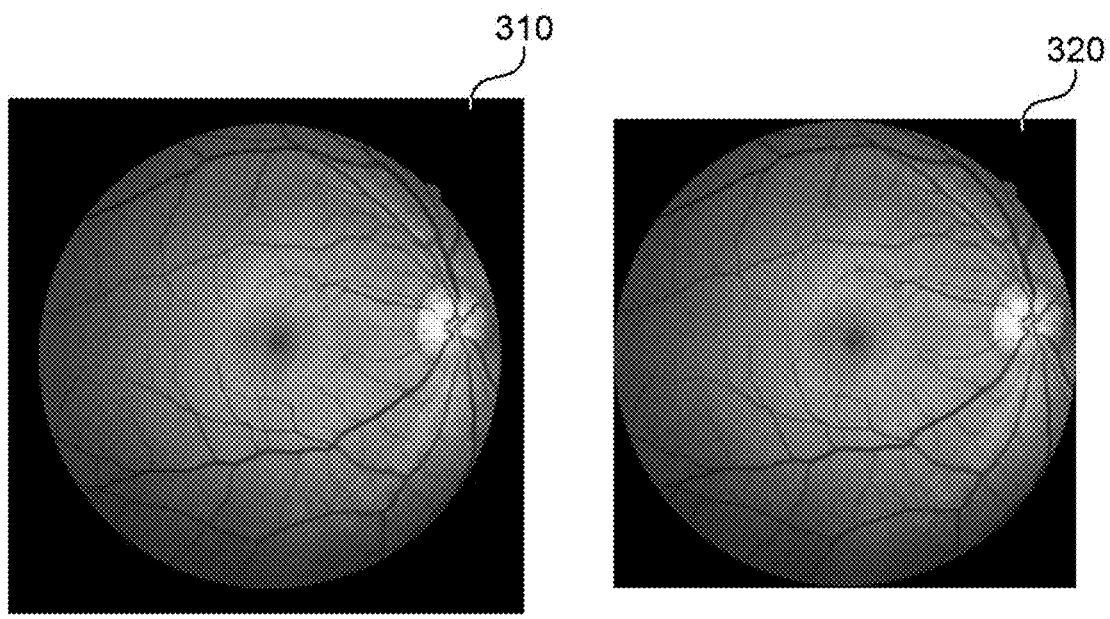
FIG. 3 illustrates views of an example of an input image.

Specifically, FIG. 3 illustrates views of an example of an input image.

In the example shown in FIG. 3, reference numeral 310 denotes an example of a retinal image (i.e., an original image) input by a user or obtained from an image database, and reference numeral 320 denotes an example of an image in which a part of a margin area, except for a retinal region, is removed from the original image 310.

Hereinafter, for convenience of description, it is assumed that the input image is the original image 310 illustrated in FIG. 3. However, it should be noted that, according to an embodiment, the input image may be the image 320 in which a part of the margin area is removed from the original image 310.

Referring back to FIG. 2, in operation 220, the computing device 12 generates a first-generation image segment set by dividing the input image in an overlapped manner.

In this case, the term "dividing the image in an overlapped manner" means generating, from a segmentation target image, a plurality of image segments each including a partial region of the segmentation target image and including a region that overlaps one or more other image segments.

That is, the first-generation image segment set includes a plurality of image segments each including a partial region of the input image. In addition, each of the plurality of image segments included in the first-generation image segment set includes a region that overlaps another image segment included in the first-generation image segment set.

Figure 4:
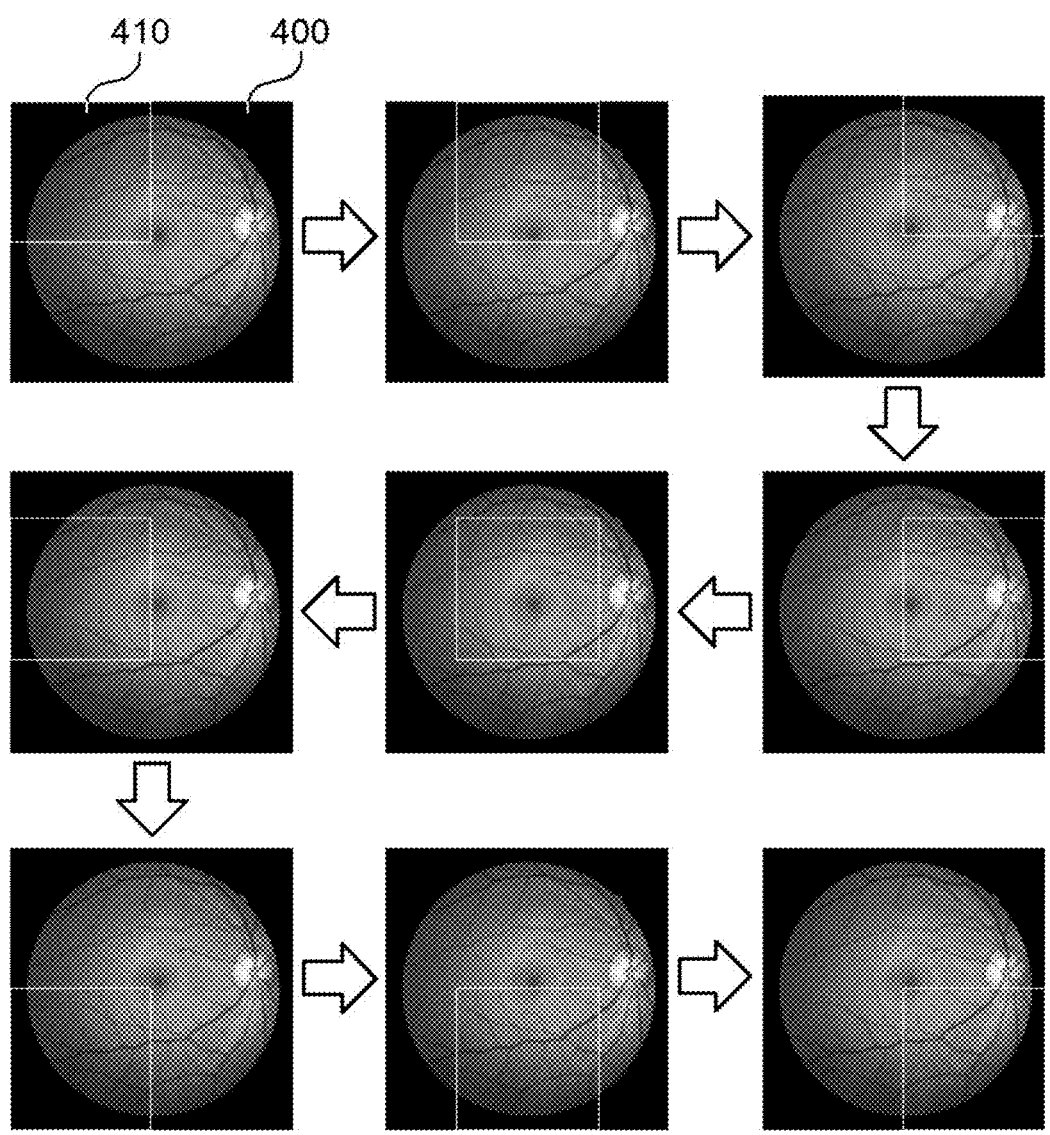
FIG. 4 illustrates views for describing an image segment generation process according to an embodiment of the present invention.

FIG. 4 illustrates views for describing an image segment generation process according to an embodiment of the present invention.

Referring to FIG. 4, a computing device 12 may arrange a window 410 of a preset size on an input image 400. In addition, while sequentially moving the window 410 in the input image 400 by a predetermined distance in an X-axis direction and an Y-axis direction, the computing device 12 may extract each region included in the window 410 as an image segment of the input image 400. In this case, a moving distance of the window 410 in the X-axis direction may be set to be smaller than a length of the window in the X-axis direction, and a moving distance of the window 410 in the Y-axis direction may be set to be smaller than a length of the window 410 in the Y-axis direction.

Meanwhile, in the example shown in FIG. 4, the size of the window 410, the moving distance in the X-axis direction, and the moving distance in the Y-axis direction may be changed according to the number of image segments to be generated and the size of the image to be divided.

FIGS. 5 to 8 are views for describing an image segment generation process according to another embodiment of the present invention.

Figure 5:
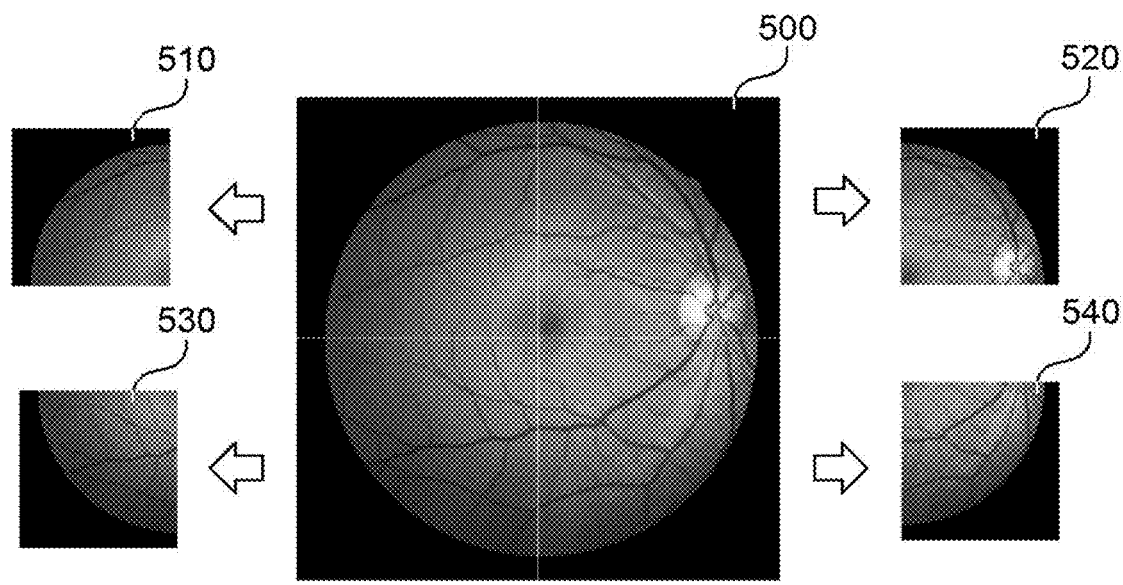
FIGS. 5 to 8 are views for describing an image segment generation process according to another embodiment of the present invention.

Referring to FIGS. 5 to 8, first, a computing device 12 may generate a first image segment 510, a second image segment 520, a third image segment 530, and a fourth image segment 540 by dividing an input image 500 into quadrants as shown in the example shown in FIG. 5.

Figure 6:
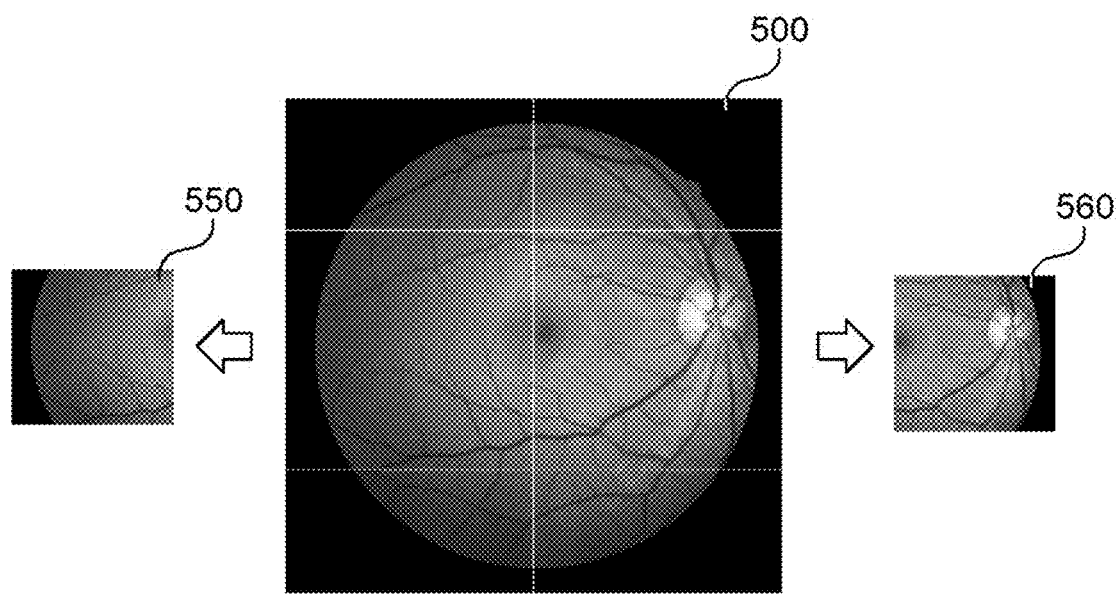

Thereafter, the computing device 12 may generate a fifth image segment 550 that includes a region corresponding to a lower half of the first image segment 510 and a region corresponding to an upper half of the third image segment 530 in the input image 500 as shown in the example shown in FIG. 6. Also, the computing device 120 may generate a sixth image segment 560 that includes a region corresponding to a lower half of the second image segment 520 and a region corresponding to an upper half of the fourth image segment 540.

Figure 7:
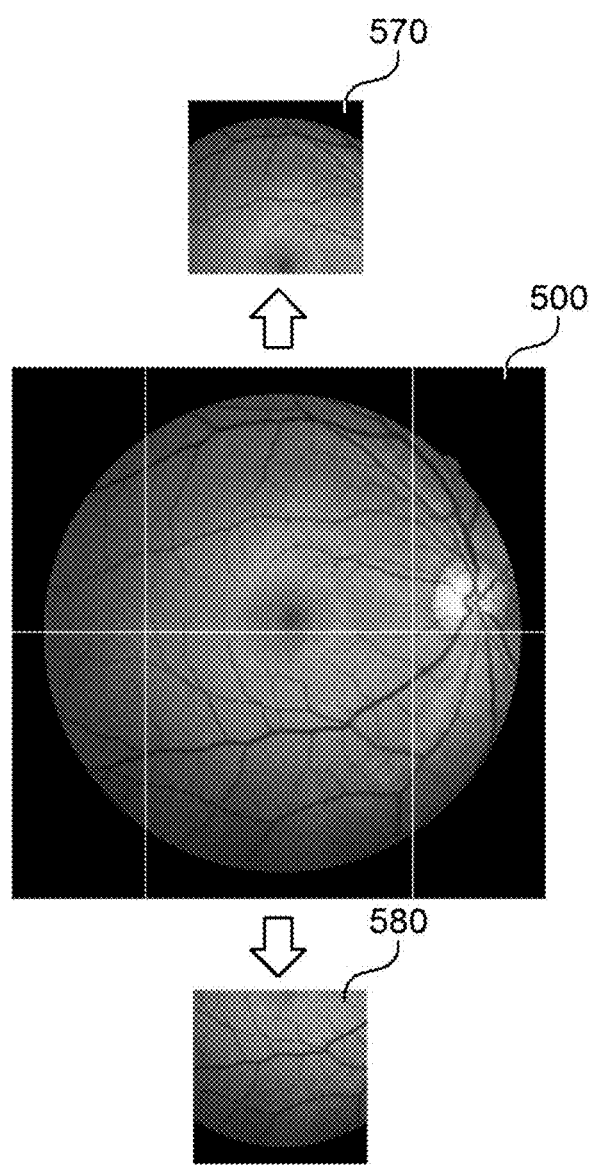

In addition, the computing device 12 may generate a seventh image segment 570 that includes a right half of the first image segment 510 and a region corresponding to a left half of the second image segment 520 in the input image 500 as shown in the example shown in FIG. 7. Further, the computing device 12 may generate an eighth image segment 580 that includes a right half of the third image segment 530 and a left half of the fourth image segment 540 in the input image 500.

Figure 8:
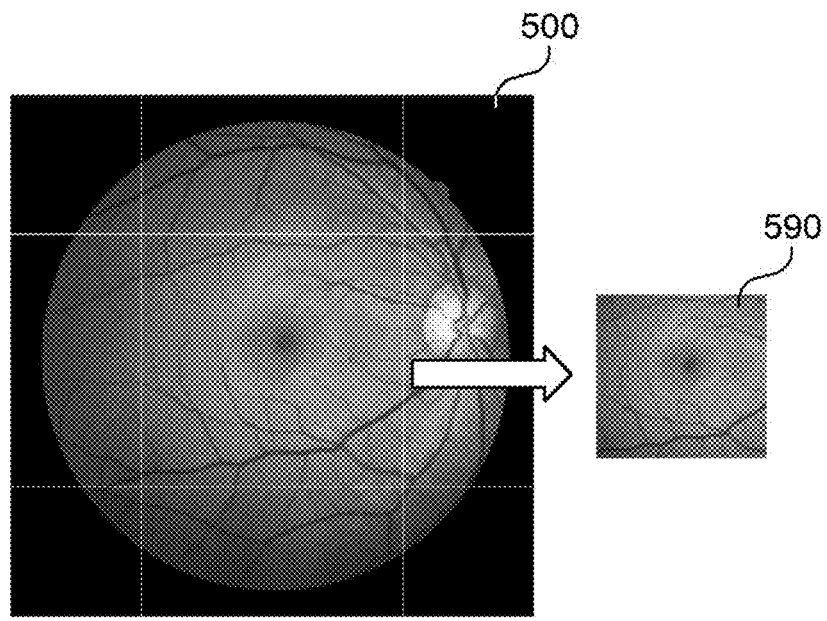

Thereafter, the computing device 12 may generate a ninth image segment 590 that includes a region corresponding to a lower half of the seventh image segment 570 and a region corresponding to an upper half of the eighth image segment 580 in the input image 500 as shown in the example illustrated in FIG. 8.

FIGS. 9 to 14 are views for describing an image segment generation process according to still another embodiment of the present invention.

Figure 9:
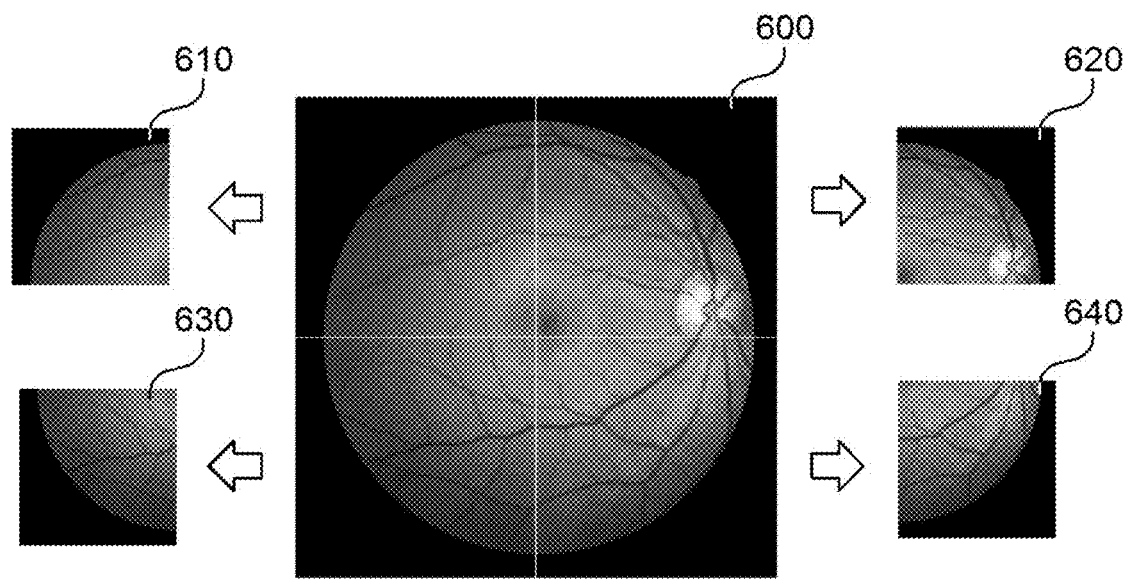
FIGS. 9 to 14 are views for describing an image segment generation process according to still another embodiment of the present invention.

Referring to FIGS. 9 to 14, first, a computing device 12 may generate a first image segment 610, a second image segment 620, a third image segment 630, and a fourth image segment 640 by dividing the input image 600 into quadrants as shown in the example shown in FIG. 9.

Figure 10:
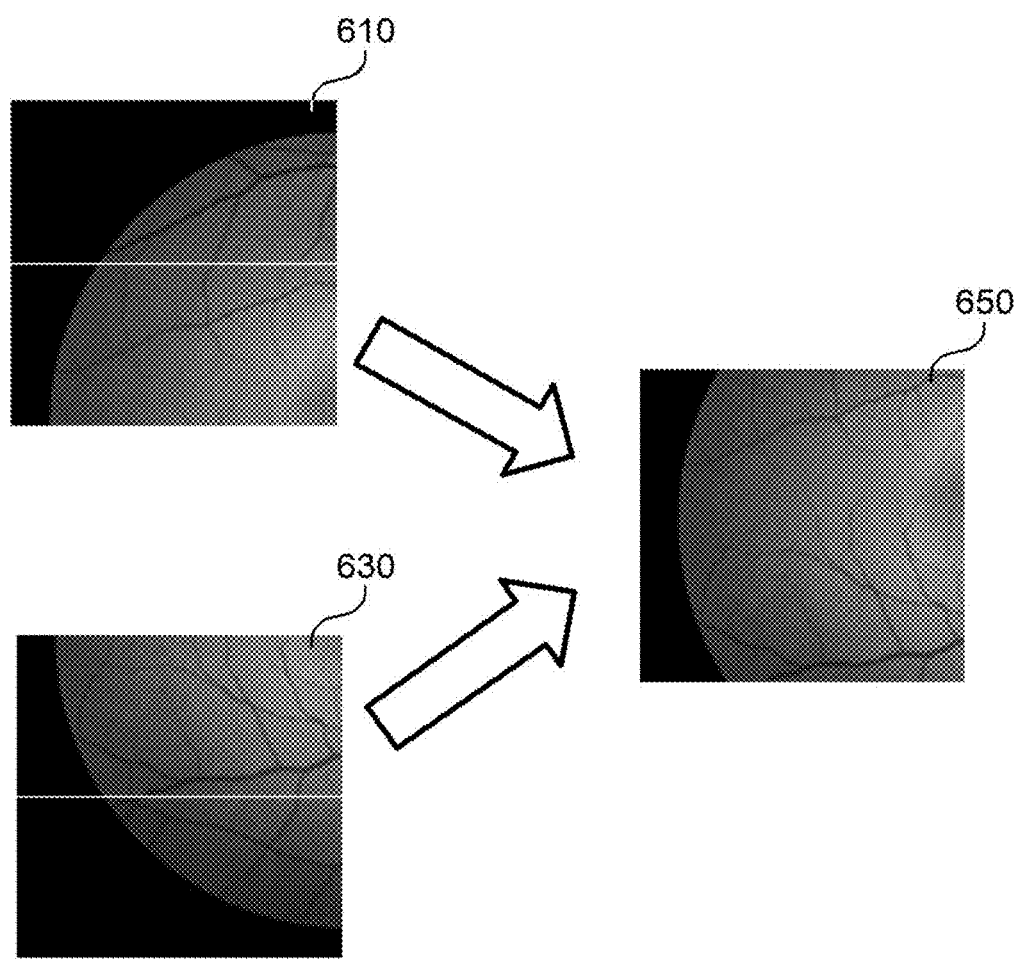

Thereafter, the computing device 12 may divide each of the first image segment 610 and the third image segment 630 into upper and lower halves and then combine the lower half of the first image segment 610 and the upper half of the third image segment 630 to generate a fifth image segment 650 as shown in the example shown in FIG. 10.

Figure 11:
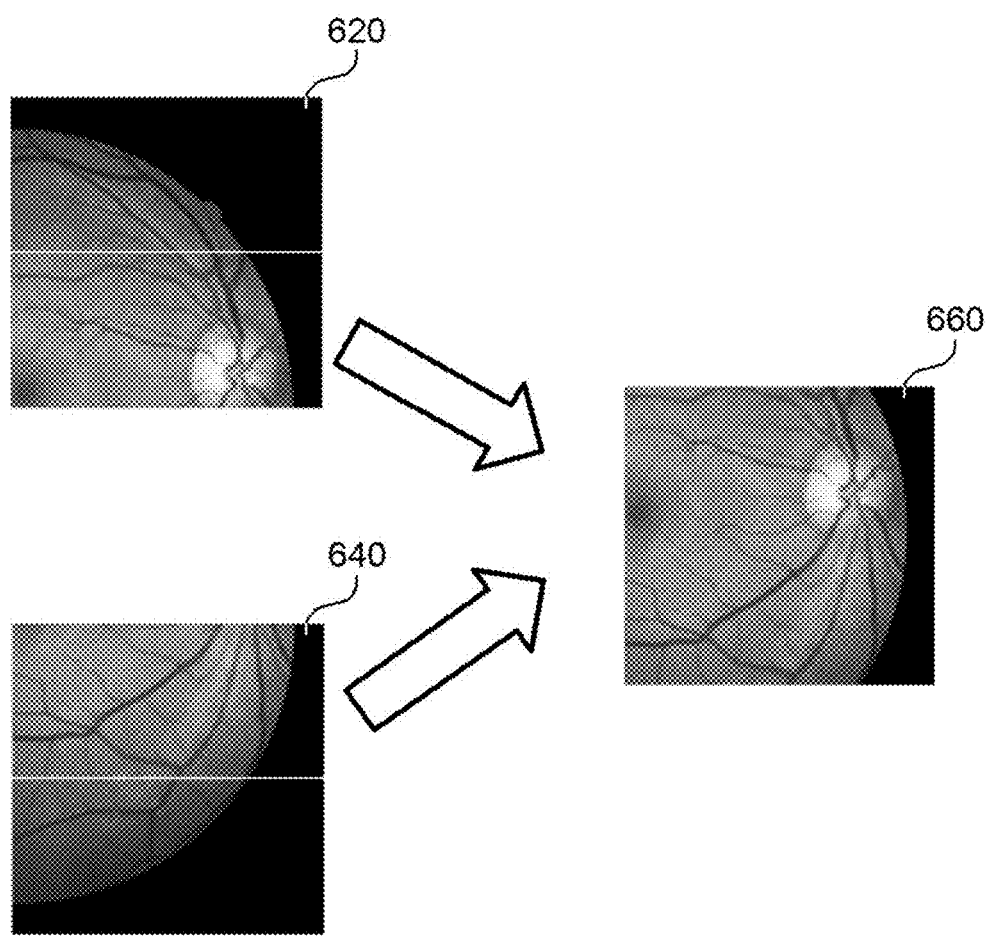

In addition, the computing device 12 may divide each of the second image segment 620 and the fourth image segment 640 into upper and lower halves and then combine the lower half of the second image segment 620 and the upper half of the fourth image segment 640 to generate a sixth image segment 660 as shown in the example shown in FIG. 11.

Figure 12:
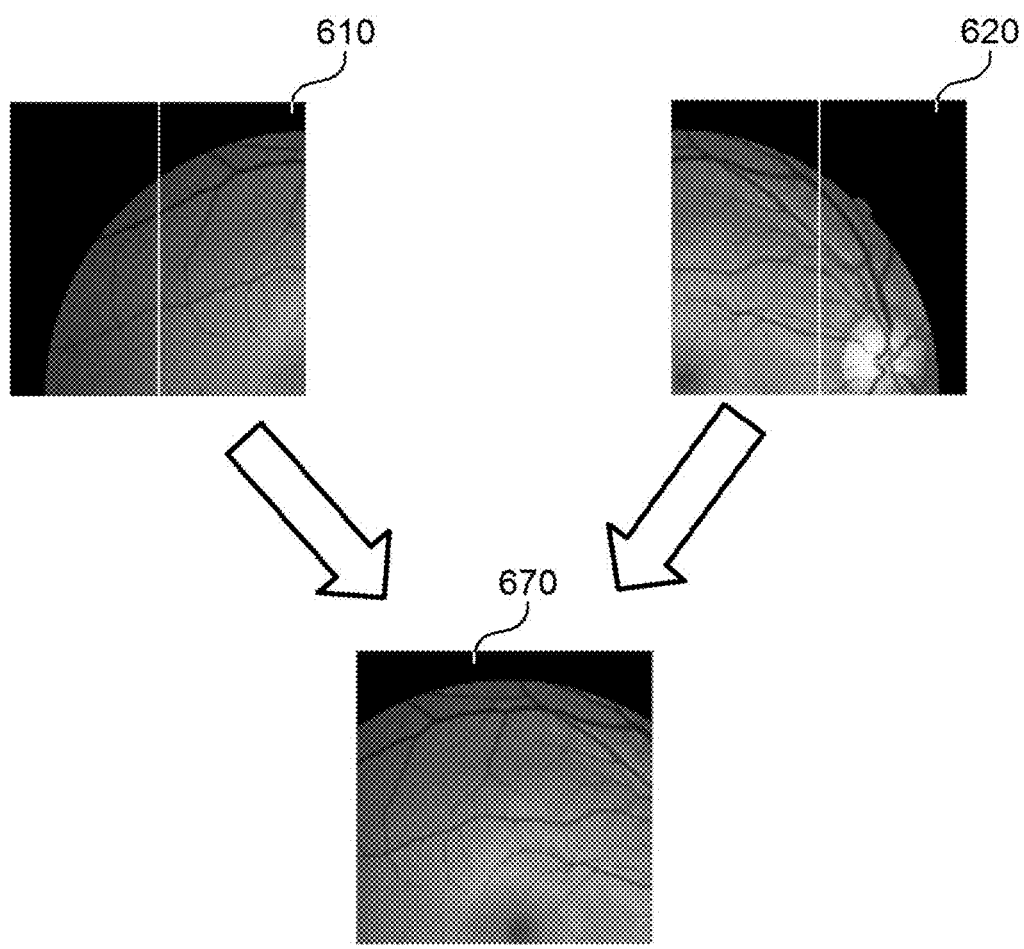

Also, the computing device 12 may divide each of the first image segment 610 and the second image segment 620 into left and right halves and then combine the right half of the first image segment 610 and the right half of the second image segment 620 to generate a seventh image segment 670 as shown in the example shown in FIG. 12.

Figure 13:
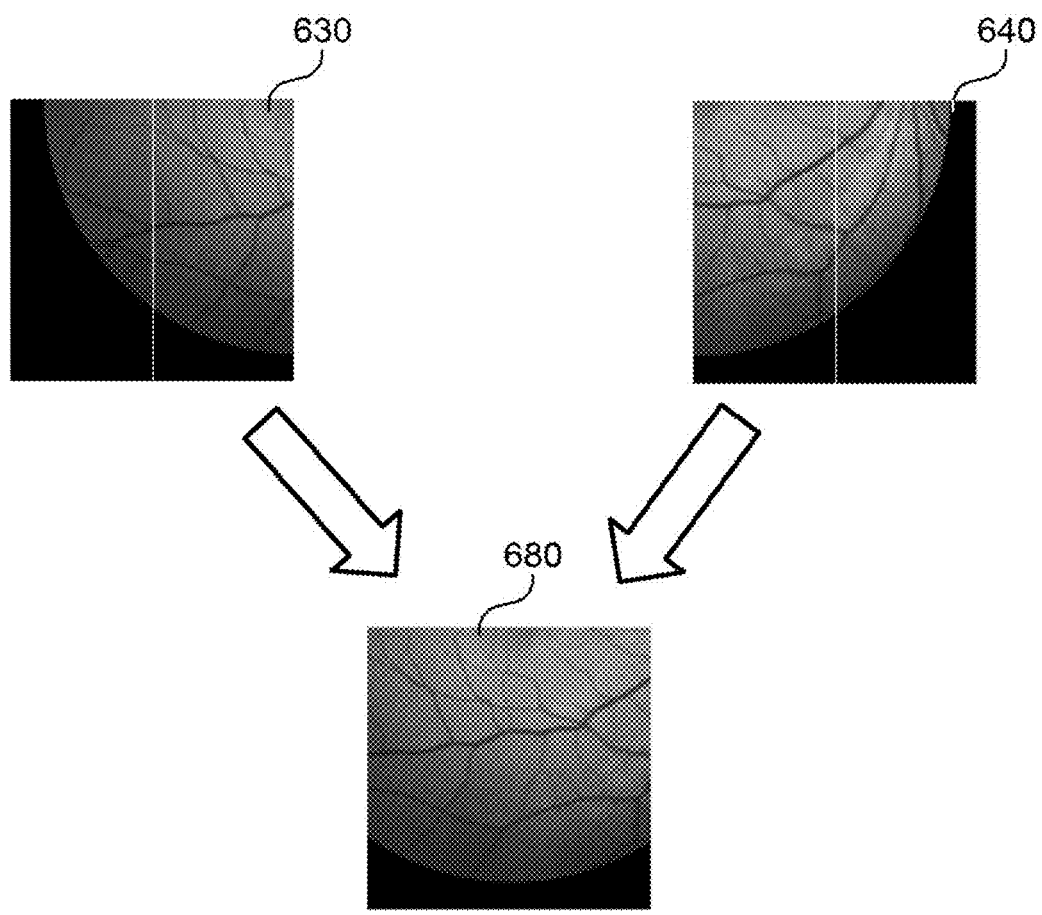

Further, the computing device 12 may divide each of the third image segment 630 and the fourth image segment 640 into left and right halves and then combine the right half of the third image segment 630 and the left half of the fourth image segment 640 to generate an eighth image segment 680 as shown in the example shown in FIG. 13.

Figure 14:
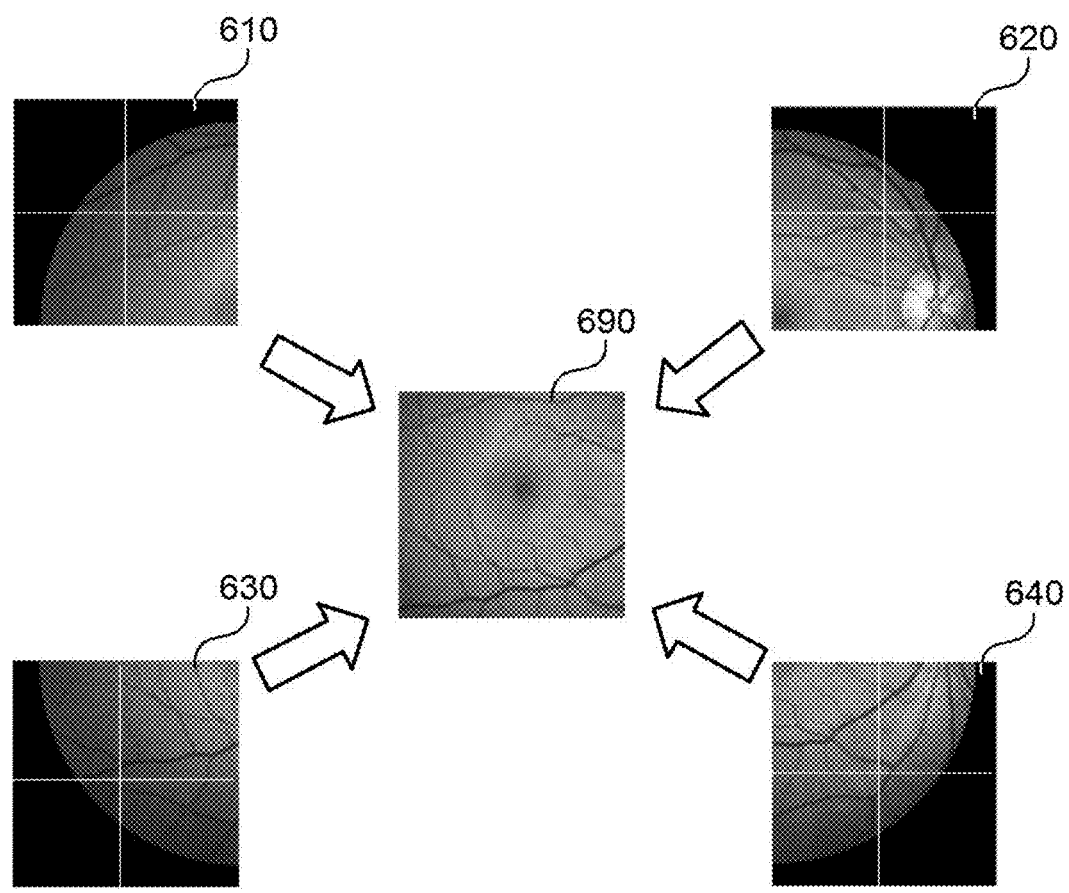

In addition, the computing device 12 may divide each of the first to fourth image segments 610, 620, 630, and 640 into quadrants and then combine the fourth quadrant of the first image segment 610, the third quadrant of the second image segment 620, the first quadrant of the third image segment 630, and the second quadrant of the fourth image segment 640 to generate a ninth image segment 690 as shown in the example shown in FIG. 14.

Figure 15:
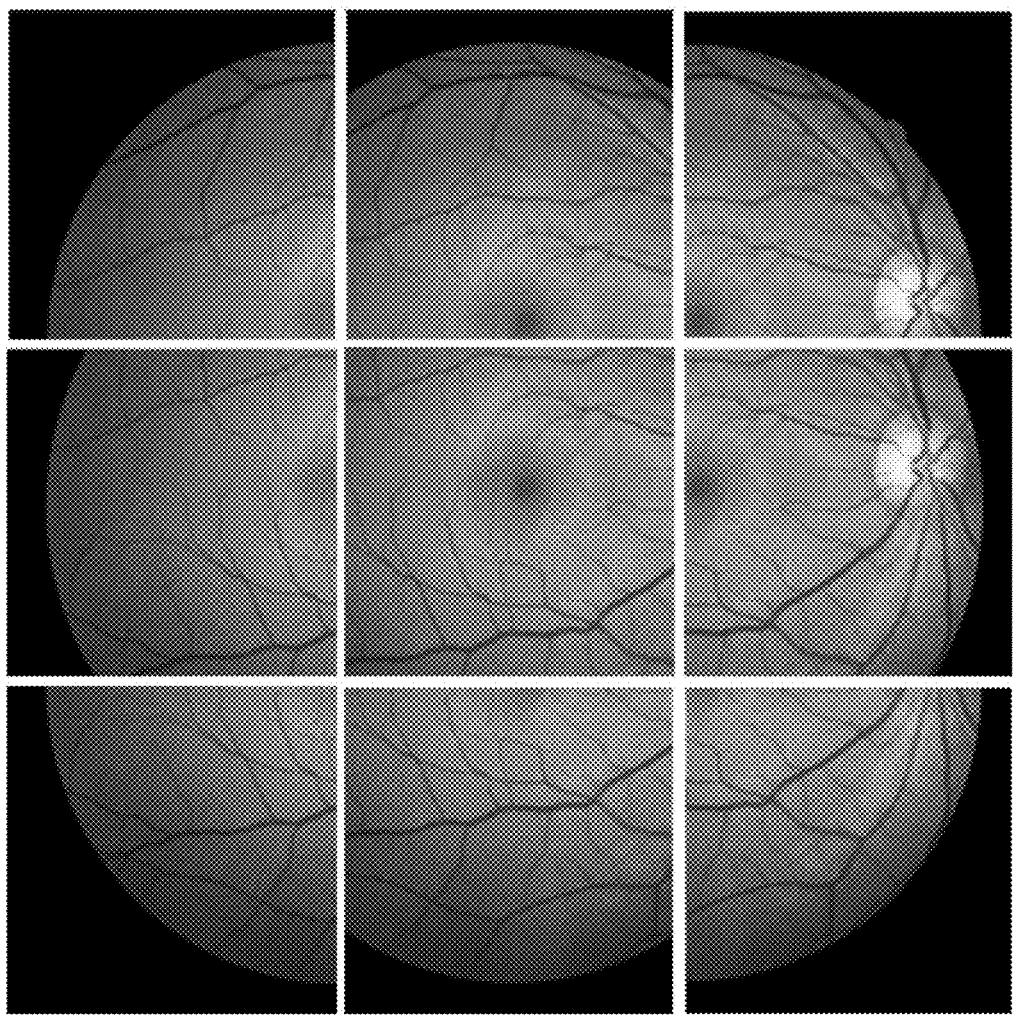
FIG. 15 is a view illustrating an example of a first-generation image segment set.

Meanwhile, FIG. 15 is a view illustrating an example of a first-generation image segment set generated according to the above-described embodiments.

As shown in the example of FIG. 15, it can be seen that the first-generation image segment set includes nine image segments, and each image segment includes a region that overlaps another image segment.

On the other hand, in the above-described example, it has been described on the assumption that nine image segments are generated from an input image, but the number of generated image segments may vary depending on the embodiment unlike the above-described example.

Also, as long as it is possible to generate a plurality of image segments each of which includes a region that overlaps one or more other image segments from the input image, the first-generation image segment set may be generated by various methods in addition to the above-described embodiments.

Referring back to FIG. 2, in operation 230, the computing device 12 generates an image segment set of a second or higher-generation from the first-generation image segment set. In this case, the computing device 12 generates a subsequent-generation image segment set by dividing in an overlapped manner at least one of the plurality of image segments included in the previous image segment set.

Specifically, according to an embodiment of the present invention, the computing device 12 may divide in an overlapped manner at least one of a plurality of image segments included in an ith-generation (where i is an integer greater than or equal to 1) image segment set to generate a (i+1)th-generation image segment set.

In this case, the (i+1)th-generation image segment set may be generated using the same method as the above-described method of generating the first-generation image segment set. In addition, each of the plurality of image segments included in the first-generation image segment set includes a region that overlaps another image segment included in the first-generation image segment set.

Figure 16:
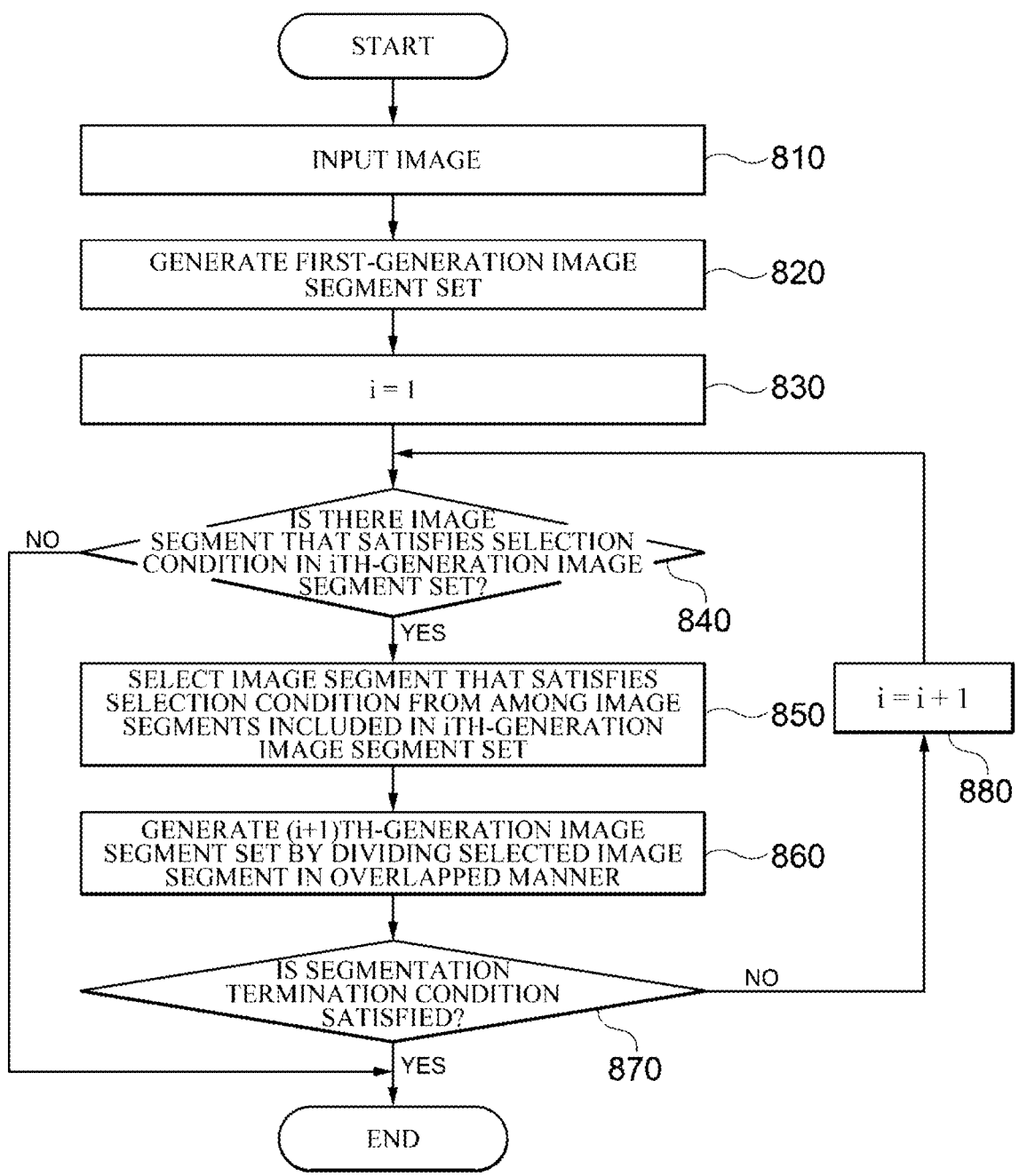
FIG. 16 is a flowchart illustrating an image segmentation method according to a further embodiment of the present invention.

FIG. 16 is a flowchart illustrating an image segmentation method according to a further embodiment of the present invention.

In the flowchart shown in FIG. 16, operations 810 and 820 are the same as operations 210 and 220 shown in FIG. 2, respectively, and thus redundant descriptions thereof will be omitted.

Referring to FIG. 16, in operation 830, a computing device 12 sets i, which denotes a generation index value of a currently generated image segment set, to 1.

In operation 840, the computing device 12 determines whether there is an image segment that satisfies a predetermined selection condition among a plurality of image segments included in the first-generation image segment set.

Specifically, according to an embodiment of the present invention, the computing device 120 may calculate pixel similarity in an image for each of the plurality of image segments included in the first-generation image segment set, and select an image segment whose calculated pixel similarity is smaller than or equal to a preset reference value. In this case, the pixel similarity may be calculated based on, for example, brightness, color value, frequency, gradient, and the like of pixels in the image segment.

Meanwhile, when there is no image segment that satisfies the predetermined selection condition among the plurality of image segments included in the first-generation image segment set, the computing device 12 terminates the generation of a subsequent-generation image segment set for the first-generation image segment set.

On the other hand, when there is at least one image segment that satisfies the predetermined selection condition among the plurality of image segments included in the first-generation image segment set, in operation 850, the computing device 12 selects each of at least one image segment that satisfies the selection condition as a target to be further segmented.

When image segments to be further segmented are selected, in operation 860, the computing device 12 divides each of the selected image segments in an overlapped manner to generate a second-generation image segment set.

Thereafter, in operation 870, the computing device 12 determines whether a preset segmentation termination condition is satisfied.

In this case, according to an embodiment of the present invention, the computing device 12 may determine whether the segmentation termination condition is satisfied on the basis of a size of each of the plurality of image segments included in the second-generation image segment set generated in operation 860 and a preset first reference value. For example, when the size of the image segment generated by dividing in an overlapped manner at least one of the plurality of image segments included in the second-generation image segment set is smaller than the first reference value, the computing device 12 may determine that the segmentation termination condition is satisfied. In this case, the first reference value may be set to be equal to a size of an input image set in a deep learning-based image classifier, which will be described below.

According to another embodiment of the present invention, the computing device 12 may determine whether the segmentation termination condition is satisfied on the basis of the total number of image segments included in the image segment sets generated so far and a preset second reference value. For example, in a case where the computing device 12 generates a third-generation image segment set from the second-generation image segment set on the basis of the total number of image segments included in the first and second-generation image segment sets that are image segment sets generated so far, when the total number of image segments exceeds the second reference value, the computing device 12 may determine that the segmentation termination condition is satisfied. In this case, the second reference value may be set to an appropriate value by the user in consideration of, for example, the amount of calculation.

On the other hand, when the segmentation termination condition is not satisfied in operation 870, the computing device 12 may increase the generation index value i by 1, and then may generate a second or higher-generation image segment set by repeatedly performing operations 840 to 860 until the aforementioned segmentation termination condition is satisfied or there is no image segment satisfying the aforementioned selection condition in the ith-generation image segment set.

Figure 17:
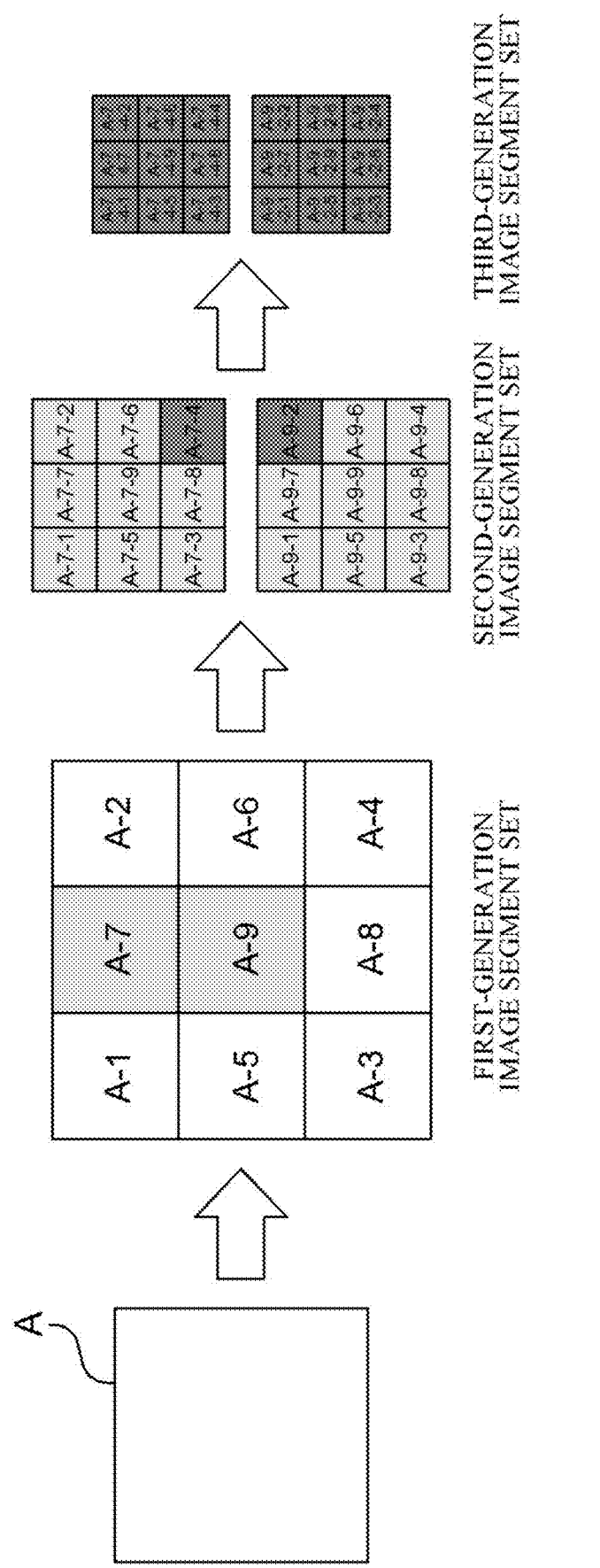
FIG. 17 is a diagram illustrating an example of image segment sets generated according to an embodiment of the present invention.

FIG. 17 is a diagram illustrating an example of image segment sets generated according to an embodiment of the present invention.

In the example shown in FIG. 17, it is assumed that first to third-generation image segments are generated from input image A.

Referring to FIG. 17, the first-generation image segment set includes nine image segments A-1 to A-9 generated by dividing the input image A in an overlapped manner.

In addition, one of the second-generation image segment sets includes nine image segments A-7-1 to A-7-9 generated by dividing in an overlapped manner the image segment A-7 included in the first-generation image segment set and the other of the second-generation image segment sets includes nine image segments A-9-1 to A-9-9 generated by dividing the image segment A-9 in an overlapped manner.

Also, one of the third-generation image segment sets includes nine image segments A-7-4-1 to A-7-4-9 generated by dividing in an overlapped manner the image segment A-7-4 included in the second-generation image segment set and the other of the third-generation image segment sets includes nine image segments A-9-2-1 to A-9-2-9 generated by dividing the image segment A-9-2 in an overlapped manner.

Meanwhile, according to an embodiment of the present invention, the computing device 12 may reduce the input image and at least some of the image segments included in each of the generated image segment sets to a preset size and generate a training image set including the reduced images. In this case, the preset size may be set to be equal to a size of the input image set in a deep learning-based image classifier.

Also, the computing device 12 may train the deep learning-based image classifier using the training image set. Meanwhile, the deep learning-based image classifier is for recognition or classification of an input image. For example, the deep learning-based image classifier may be a convolutional neural network (CNN) model, but is not limited to a specific architecture as long as it can be trained using a plurality of training images.

Figure 18:
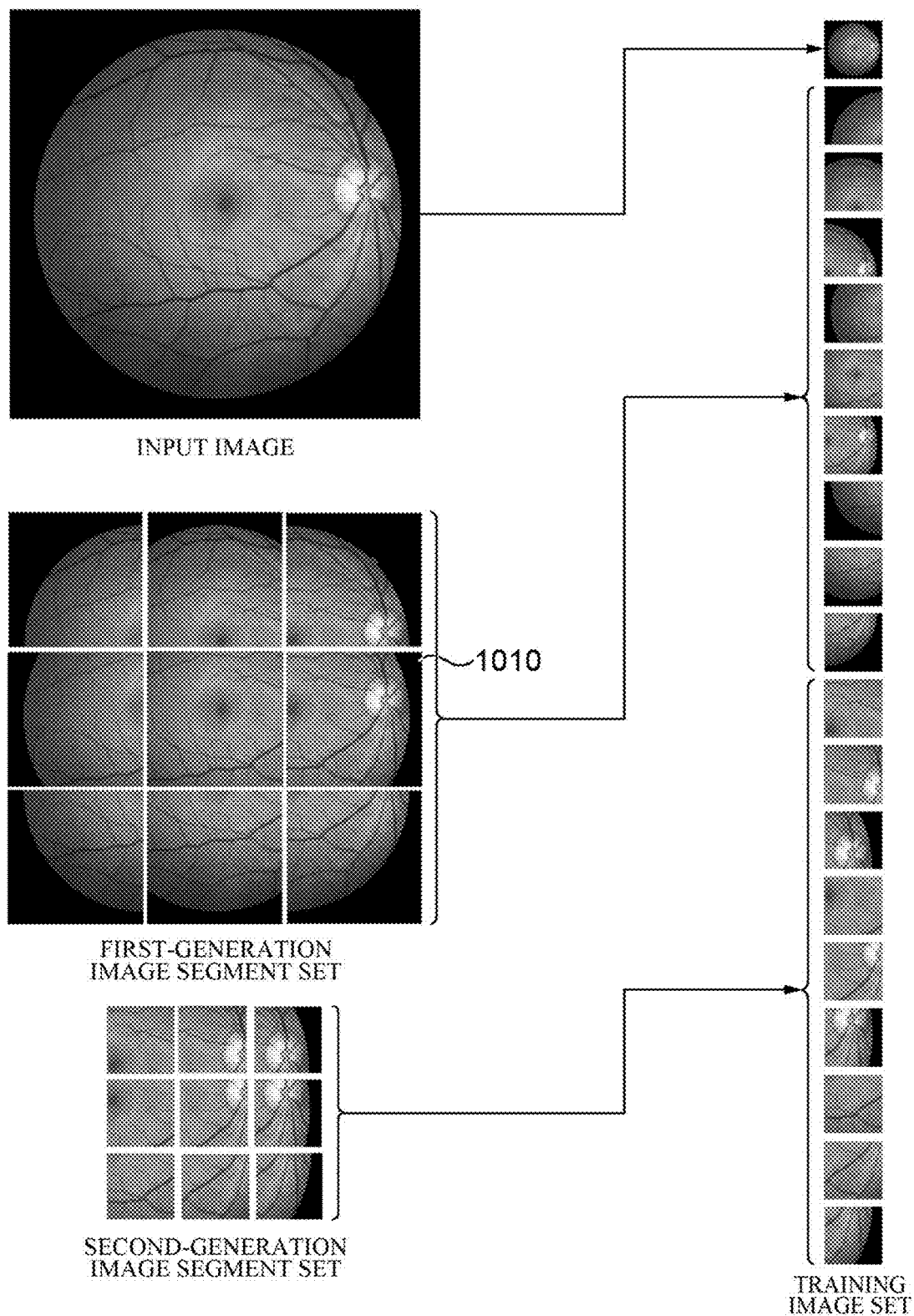
FIGS. 18 and 19 are exemplary diagrams for describing generation of a training image set according to an embodiment of the present invention.
Figure 19:
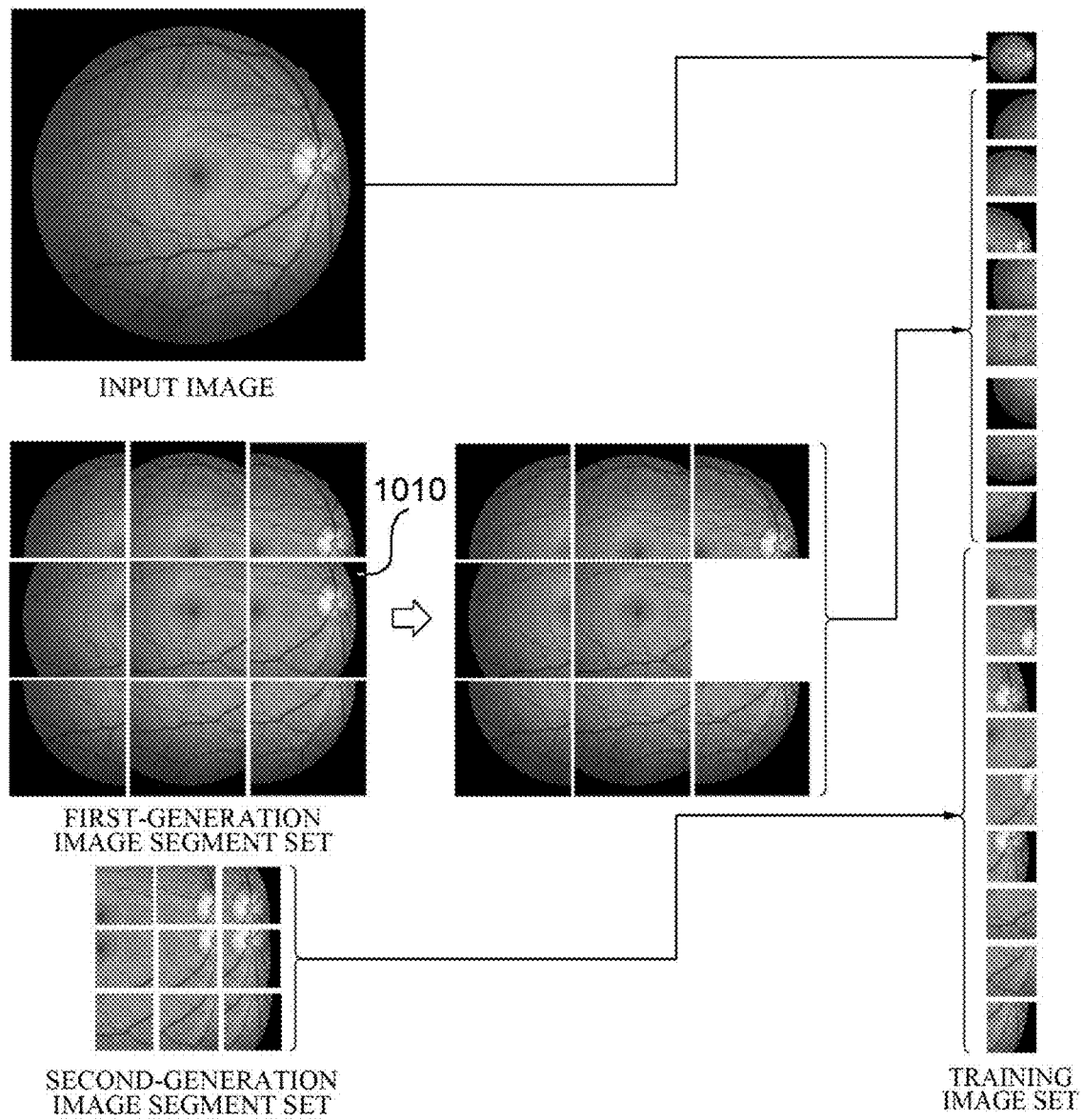

FIGS. 18 and 19 are exemplary diagrams for describing generation of a training image set according to an embodiment of the present invention.

In the example shown in FIGS. 18 and 19, for convenience of description, it is assumed that a first-generation image segment set is generated from an input image and a second-generation image segment set is generated from one image segment 1010 of the first-generation image segment set.

Referring to FIG. 18, a computing device 12 may reduce, for example, the input image, the image segment included in the first-generation image segment set, and the image segment included in the second-generation image segment set to a preset size and generate a training image set including the reduced images.

In another example, referring to FIG. 19, the computing device 12 may reduce the input image and each of the image segments included in the second-generation image segment set, which is the last generation image segment set, to a preset size.

In addition, the computing device 12 may reduce each of the image segments included in the first-generation image segment set, except the image segment 1010 used for generating the second-generation image segment set, to a preset size.

The computing device 12 may then generate a training image set that includes the reduced images.

That is, when the first to nth- (where n is an integer greater than or equal to 2) generation image segment sets are generated from the input image, according to an embodiment, the computing device 12 may use all of the image segments included in the first to nth-generation image segment sets to generate the training image set as shown in the example shown in FIG. 18, or may use image segments included in each of the first to (n-1)th-generation image segment sets which are not used for generating the subsequent-generation image segment set and the image segments included in the nth-generation image segment set to generate the training image set as shown in the example shown in FIG. 19.

Meanwhile, in addition to the above examples, the image segment selection for generating the training image set may be modified in various ways in consideration of the training efficiency, the accuracy of the training result, the amount of computation, and the like.

Meanwhile, the embodiment of the present invention may include programs for performing the methods described herein on a computer and computer-readable recording media including the programs. The computer-readable recording media may include, alone or in combination with, program commands, local data files, local data structures and the like. The media may be specially designed and configured for the present invention, or known and available to those of ordinary skill in the field of computer software. Examples of the computer-readable recording media include magnetic media, such as hard disks, floppy disks, and magnetic tapes, optical recording media, such as CD-ROM disks and DVDs, magneto-optical media, such as floptical disks, and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. An image segmentation method, which performed in a computing device having one or more processors and a memory for storing one or more programs executed by the one or more processors, the method comprising the steps of:
    (a) receiving an input image;
    (b) generating a first-generation image segment set by dividing the input image in an overlapped manner;
    (c) generating a second or higher-generation image segment set from the first-generation image segment set, wherein a subsequent-generation image segment set is generated by dividing in an overlapped manner at least one image segment that satisfies a preset selection condition among a plurality of image segments comprised in the previous-generation image segment set, wherein the preset selection condition is related to pixel similarity in an image; and
    (d) generating a training image set including the input image and at least a part of image segments included in the first-generation image segment set and the subsequent-generation image segment set,
    wherein the step (c) comprises:
    calculating the pixel similarity in an image for each of the plurality of image segments comprised in the previous-generation image segment set by comparing each pixel in the image with other pixels in the same image based on at least one of brightness, color value, frequency and gradient of pixels; and
    generating the subsequent-generation image segment set by dividing in an overlapped manner each of image segments that have the pixel similarity smaller than or equal to a preset reference value among the plurality of image segments comprised in the previous-generation image segment set.

2. The image segmentation method of claim 1, wherein each of a plurality of image segments included in a $j^{th}$-generation image segment set comprises a region that overlaps one or more other image segments included in the $j^{th}$-generation image segment set, where j of the $j^{th}$-generation image segment set is an integer greater than or equal to 1.

3. The image segmentation method of claim 1, wherein the step (c) terminates generation of the subsequent-generation image segment set when there is no image segment whose pixel similarity is smaller than or equal to the reference value.

4. The image segmentation method of claim 1, wherein the step (c) terminates generation of the subsequent-generation image segment set when a preset segmentation termination condition is satisfied.

5. The image segmentation method of claim 4, wherein the step (c) determines whether the preset segmentation termination condition is satisfied based on a size of each of the image segments comprised in the previous-generation image segment set and a preset reference value.

6. The image segmentation method of claim 4, wherein the step (c) determines whether the preset segmentation termination condition is satisfied based on a total number of image segments comprised in image segment sets generated so far and a preset reference value.

7. The image segmentation method of claim 1, wherein the step (d) comprises:
    reducing the input image and at least a part of the image segments included in each of the first to $n^{th}$-generation image segment sets to a preset size, where n of the $n^{th}$-generation image segment is an integer greater than or equal to 2.

8. The image segmentation method of claim 7, further comprising:
    (e) training a deep learning-based image classifier using the reduced images.

9. An image segmentation device comprising:
    one or more processors;
    a memory; and
    one or more programs stored in the memory, the one or more programs configured to be executed by the one or more processors, the one or more programs comprising commands for performing the steps of:
    (a) receiving an input image,
    (b) generating a first-generation image segment set by dividing the input image in an overlapped manner,
    (c) generating a second or higher-generation image segment set from the first-generation image segment set, wherein a subsequent-generation image segment set is generated by dividing in an overlapped manner at least one image segment that satisfies a preset selection condition among a plurality of image segments comprised in the previous-generation image segment set, wherein the preset selection condition is related to pixel similarity in an image, and
    (d) generating a training image set including the input image and at least a part of image segments included in the first-generation image segment set and the subsequent-generation image segment set,
    wherein the step (c) comprises:
    calculating the pixel similarity in an image for each of the plurality of image segments comprised in the previous-generation image segment set by comparing each pixel in the image with other pixels in the same image based on at least one of brightness, color value, frequency and gradient of pixels; and
    generating the subsequent-generation image segment set by dividing in an overlapped manner each of image segments that have the pixel similarity smaller than or equal to a preset reference value among the plurality of image segments comprised in the previous-generation image segment set.

10. The image segmentation device of claim 9, wherein each of a plurality of image segments included in a $j^{th}$-generation image segment set includes a region that overlaps one or more other image segments included in the $j^{th}$-generation image segment set, where j of the $j^{th}$-generation image segment set is an integer greater than or equal to 1.

11. The image segmentation device of claim 9, wherein the step (c) terminates generation of the subsequent-generation image segment set when there is no image segment whose pixel similarity is smaller than or equal to the reference value.

12. The image segmentation device of claim 9, wherein the step (c) terminates generation of the subsequent-generation image segment set when a preset segmentation termination condition is satisfied.

13. The image segmentation device of claim 12, wherein the step (c) determines whether the preset segmentation termination condition is satisfied based on a size of each of the image segments comprised in the previous-generation image segment set and a preset reference value.

14. The image segmentation device of claim 12, wherein the step (c) determines whether the preset segmentation termination condition is satisfied based on a total number of image segments comprised in image segment sets generated so far and a preset reference value.

15. The image segmentation device of claim 9, wherein the step (d) comprises reducing the input image and a least a part of the image segments comprised in each of the first to $n^{th}$-generation image segment sets to a preset size, where n of the $n^{th}$-generation image segment is an integer greater than or equal to 2.

16. The image segmentation device of claim 15, wherein the one or more programs further comprise a command for performing training a deep learning-based image classifier using the reduced images.

* * * * *